United States Patent [19]
Ingle

[11] Patent Number: 5,941,269
[45] Date of Patent: Aug. 24, 1999

[54] PRESSURE RELIEF DEVICE

[75] Inventor: William D. Ingle, Park Ridge, Ill.

[73] Assignee: Gas Research Institute, Chicago, Ill.

[21] Appl. No.: 08/845,002

[22] Filed: Apr. 22, 1997

[51] Int. Cl.[6] .................................................. F16K 17/40
[52] U.S. Cl. .............................................. 137/74; 137/79
[58] Field of Search ................................ 137/72, 74, 79

[56] References Cited

U.S. PATENT DOCUMENTS

| | | |
|---|---|---|
| 1,744,977 | 1/1930 | Lovekin . |
| 1,924,417 | 8/1933 | Ryan . |
| 2,671,461 | 3/1954 | Hebert . |
| 3,618,627 | 11/1971 | Wagner . |
| 4,899,777 | 2/1990 | Stone et al. ............................. 137/74 |
| 5,275,194 | 1/1994 | Gray, Jr. . |
| 5,435,333 | 7/1995 | Duvall ................................. 137/74 X |
| 5,743,285 | 4/1998 | Shalkevich ............................... 137/74 |

*Primary Examiner*—John Fox
*Attorney, Agent, or Firm*—Pauley Petersen Kinne & Fejer

[57] ABSTRACT

A pressure relief device which operates between a closed condition wherein a fluid is contained within a vessel and an open condition wherein the fluid is discharged from the vessel by flowing through the pressure relief device. A plug is mounted within a cavity of a plug housing which is secured with respect to the vessel. The plug housing and/or the plug form at least one passageway. In the open condition of the pressure relief device, the passage allows communication between an inlet and an outlet of the plug housing. In the closed condition of the pressure relief device, there is no communication through the passageway and thus the fluid does not flow from the inlet to the outlet of the plug housing. A void, preferably an annular space, is formed between the plug and the plug housing. A fusible alloy, or other suitable eutectic material, is at least partially filled within the void.

12 Claims, 2 Drawing Sheets

PRESSURE RELIEF DEVICE

BACKGROUND OF THE INVENTION

1. Field of the Invention

This invention relates to a pressure relief device that has a plug that is mounted within a plug cavity of a plug housing. When the plug moves within the cavity from a closed condition to an open condition of the pressure relief device, a bypass passage communicates with an inlet and an outlet of the plug housing and thereby allows the pressurized fluid to discharge.

2. Description of Prior Art

U.S. Pat. No. 1,744,977 discloses a temperature controlled relief valve. The valve has a tubular skirt portion with openings. The tubular skirt portion fits within a passageway to guide the valve in its movement between a seated position and a non-seated position. In the seated position, a fusible material is positioned to retain a plug which is rotatably mounted with respect to a valve body. The fusible material is positioned between a downstream face of a cylindrical stem and the plug. When the fusible material melts, the plug moves with respect to the valve body and thereby exposes openings for communication between an inlet and an outlet of the valve.

U.S. Pat. No. 1,924,417 teaches a valve that has a fusible material positioned between a downstream face of a valve stem and a cap member. As the fusible material melts, the valve stem forces the fusible material into an annular space and thus allows a valve seat to move and thereby form communication between an inlet and an outlet of a valve body.

U.S. Pat. No. 2,671,461 teaches a valve that operates with fusible material. A valve stem is urged into a normally closed position by a force applied to the fusible material which contacts the valve stem. When the fusible material melts, air pressure from an inlet side forces the stem into an open position and thus allows communication between an inlet and an outlet of the valve.

U.S. Pat. No. 3,618,627 discloses a pressure relief valve which has a fusible plug positioned in a valve stem. A spring urges a plunger into a normally closed position. As the fusible material melts and flows into spaces provided by the spring, the plunger moves into an open position and allows communication between an inlet and an outlet of the valve.

U.S. Pat. No. 5,275,194 discloses a fire control valve that has a replaceable locking pin assembly. A fusible material holds a locking pin in a locked position which retains a valve member in a closed position. As the fusible material melts, a spring-loaded locking pin forces the fusible material out of a housing and allows a valve member to move and thereby form communication between an inlet and an outlet of the valve. In a closed position of the valve, one site pin extends beyond a housing to indicate valve closure and in an open condition of the valve, another pin extends beyond the housing to indicate the open condition of the valve. Only one of the two pins are exposed or extend beyond the housing at one time.

SUMMARY OF THE INVENTION

It is one object of this invention to provide a pressure relief device that allows pressurized fluid to discharge through a bypass passage when the pressure relief device is in an open condition.

It is another object of this invention to provide a pressure relief device that increases surface area contact between a fusible material and a plug of the pressure relief device.

It is another object of this invention to provide a pressure relief device that reduces pressurized fluid leakage, as a result of creep of a plug with respect to a plug housing.

The above and other objects of this invention are accomplished with a pressure relief device that has a plug mounted within a cavity of a plug housing. Preferably, an annular void is formed between the plug and the plug housing. A fusible alloy at least partially fills the void. Upon reaching an elevated temperature, the fusible alloy melts and allows the plug to move within the cavity from a closed condition to an open condition. In the open condition, a bypass passage allows the pressurized fluid to pass around the plug. The plug preferably remains within the cavity.

The bypass passage can be formed within the plug or the plug housing. The dimensions, shape, layout and position of the bypass passage can be designed to minimize the distance that the plug must travel, with respect to the plug housing, in order to expose the bypass passage and thereby form communication between the inlet and the outlet of the pressure relief device.

By using a bypass passage, the pressure relief device can be constructed so that the inlet is generally aligned with the outlet. Such construction allows for easy installation between an existing vessel and existing vent piping or other tubing.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
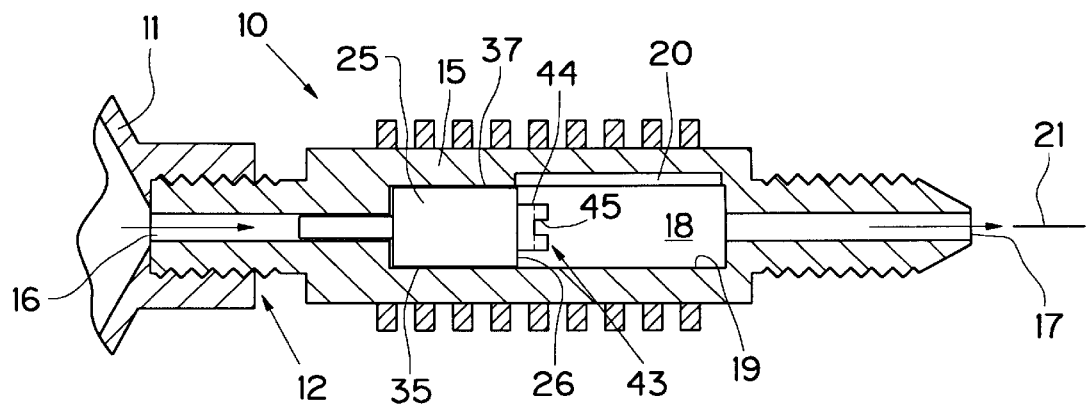
FIG. 1 is a schematic view of a cross section of a pressure relief device in a closed position, according to one preferred embodiment of this invention.
Figure 2:
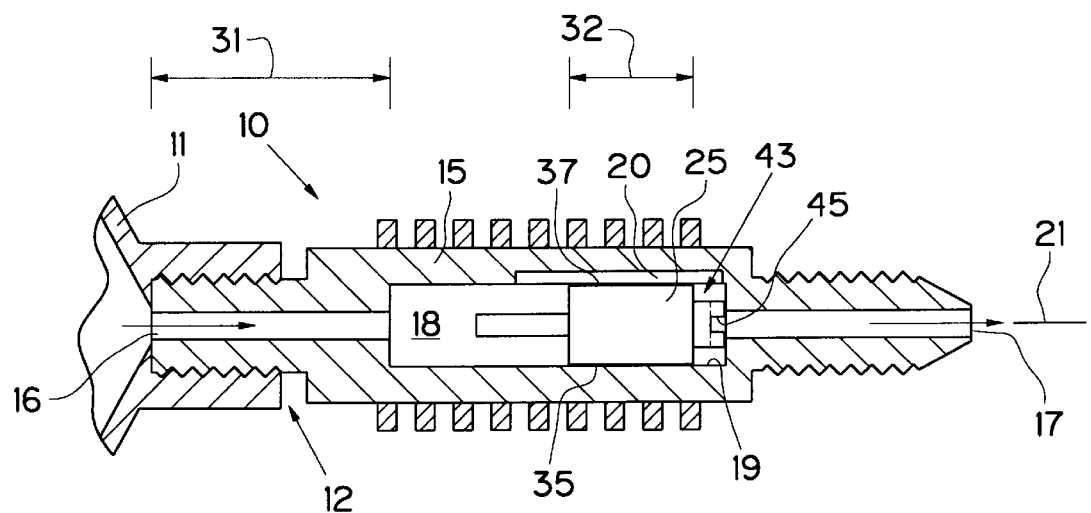
FIG. 2 is a schematic view of the cross section shown in FIG. 1, with the pressure relief device in an open condition.

FIG. 1 shows pressure relief device 10 in a closed condition and FIG. 2 shows pressure relief device 10 in an open condition, both according to one preferred embodiment of this invention. The preferred embodiment shown in FIGS. 1 and 2 is particularly useful for maintaining general alignment between inlet 16 and outlet 17 of plug housing 15. With such arrangement, it is possible to maintain alignment of already existing vent piping, which is often of a rigid type. It is also possible to maintain such alignment without discharging plug 25 from plug housing 15. Maintaining alignment of inlet 16 and outlet 17 eliminates the need to remove and reconstruct existing vent piping and thus reduces the downtime, labor and costs associated with retrofitting existing systems.

FIG. 1 shows the closed condition of pressure relief device 10, wherein plug 25 prevents communication between inlet 16 and outlet 17. FIG. 2 shows an open condition of pressure relief device 10, wherein plug 25 is moved with respect to plug housing 15, as compared to the position of plug 25 as shown in FIG. 1, in order to expose passage 20 to both inlet 16 and outlet 17, such as by way of cavity 18 of plug housing 15. When pressure relief device 10 operates in the open condition, pressurized fluid flows from within vessel 11 and is discharged through outlet 17.

Securement means are used to sealably secure plug housing 15 with respect to vessel 11. It is apparent that a threaded connection can be used, as shown in FIG. 1. It is also apparent that any other suitable connection that achieves a proper seal, as known to those skilled in the art, can be used to secure plug housing 15 with respect to vessel 11.

As shown in FIGS. 1 and 2, plug 25 is mounted within cavity 18. Plug 25 preferably has a circular or cylindrical outer surface that conforms to an inner surface of plug housing 15, such as the inner surface which defines cavity 18. Void 35 is preferably formed as an annular space between plug housing 15 and plug 25. According to this invention, any other suitable cross section of plug 25 and/or plug housing 15 can be used to accomplish the same result of allowing plug 25 to move with respect to plug housing 15. For example, the corresponding cross sections can be polygonal or some other non-circular shape. However, a circular cross section allows plug 25 to move both longitudinally and radially with respect to plug housing 15.

Fusible alloy 37 is positioned within or at least partially fills void 35. It is one object of this invention to prevent creep, displacement resulting from shear force-induced cold flow of fusible alloy 37. Thus, it is preferred to have a geometrically high aspect ratio with respect to a length, which is parallel to acting forces, and a width, which is perpendicular to acting forces, of or upon fusible alloy 37. According to one preferred embodiment of this invention, the annular space of void 35 provides significantly increased surface area contact between fusible alloy 37 and plug housing 15 and/or plug 25. By maximizing the longitudinal or axial length of fusible alloy 37 within void 35, which is preferably an annular space, and minimizing the width or thickness of fusible alloy 37 between plug housing 15 and plug 25, it is possible to maximize the frictional forces that resist creep of plug 25 with respect to plug housing 15.

It is important to reduce creep of a plug with respect to a plug housing, particularly with conventional pressure relief devices that use a fusible alloy. Even the slightest amount of creep in conventional pressure relief devices can result in fluid leakage. The design associated with certain preferred embodiments of this invention combines increased forces that resist creep with bypass passage design to provide a pressure relief device that will not leak even if relatively small amounts of creep of plug 25 occurs.

Bypass means are used to form discharge communication between inlet 16, outlet 17, cavity 18, a chamber of vessel 11 and an atmosphere outside of vessel 11, when pressure relief device 10 is in the open condition. In one preferred embodiment according to this invention, the bypass means comprise plug housing 15 having at least one passage 20 in communication with outlet 17. As shown in FIGS. 1 and 2, passage 20 is formed as a groove or channel within plug housing 15. When plug 25 moves to the right, as shown in FIG. 2, passage 20 communicates with inlet 16 and outlet 17, thereby allowing fluid to flow and discharge through pressure relief device 10. In the closed condition, plug 25 prevents communication between inlet 16 to outlet 17.

Passage 20 can be formed by any other suitable internal passageway, or even external tubing, piping or the like. Passage 20 can be constructed with any mechanical system that allows communication between inlet 16 and outlet 17 when plug 25 is in the open condition, and which also prevents communication between inlet 16 and outlet 17 when plug 25 is in the closed condition. However, passage 20 as shown in FIGS. 1 and 2 can be used to reduce the overall dimensions of plug housing 15.

Plug housing 15 preferably comprises at least one passage 20. In certain embodiments, depending upon flow requirements, a plurality of passages 20 can be used to accomplish increased flow. As shown in FIGS. 1 and 2, passage 20 is positioned approximately parallel to a longitudinal direction, along longitudinal axis 21, of cavity 18. Although preferred, passage 20 need not be generally linear. However, minimizing the length of passage 20 will also minimize flow restrictions due to frictional forces.

A longitudinal dimension of passage 20, as shown in FIG. 2, is preferably but not necessarily greater than a longitudinal length of longitudinal section 32 of plug 25. As shown in FIGS. 1 and 2, longitudinal section 32 has a different or greater diameter than longitudinal section 31. Reducing the diameter or cross-sectional area of longitudinal section 31 results in decreased forces acting upon plug 25.

As shown in FIGS. 1 and 2, relief means 43 are used to prevent plug 25 from blocking fluid flow through outlet 17, with pressure relief device 10 in the open condition. In one preferred embodiment according to this invention, relief means 43 comprise stop body 44 attached to plug 25. The attachment can be accomplished in any suitable manner known to those skilled in the art. In the open condition, stop body 44 is positioned between plug 25 and internal surface 19 of plug housing 15. Stop body 44 can have one or more relief channels 45 that allow fluid to flow from passage 20 through relief channel 45 to outlet 17.

As shown in FIGS. 1 and 2, stop body 44 is positioned at a central location with respect to downstream face 26 of plug 25. As used throughout this specification and in the claims, the term downstream is intended to relate to a relative direction of flow of the fluid through pressure relief device 10 when in the open condition. Stop body 44 can be of any other suitable design that prevents plug 25 from blocking outlet 17 when pressure relief device 10 is in the open condition.

Figure 3:
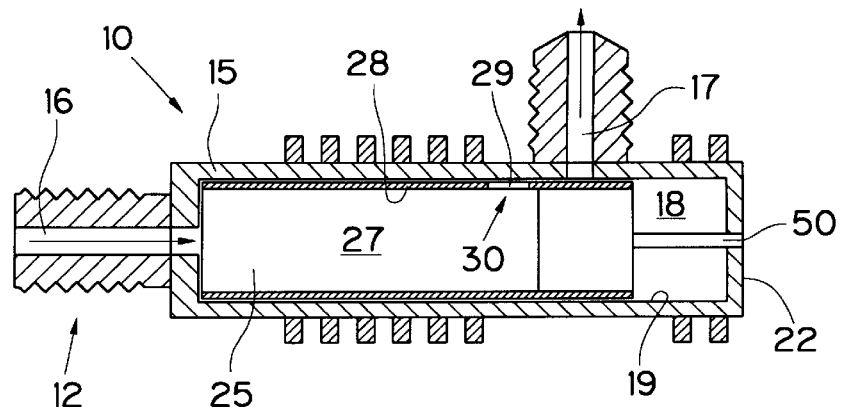
FIG. 3 is a schematic view of a cross section of a pressure relief device, according to another preferred embodiment of this invention.
Figure 4:
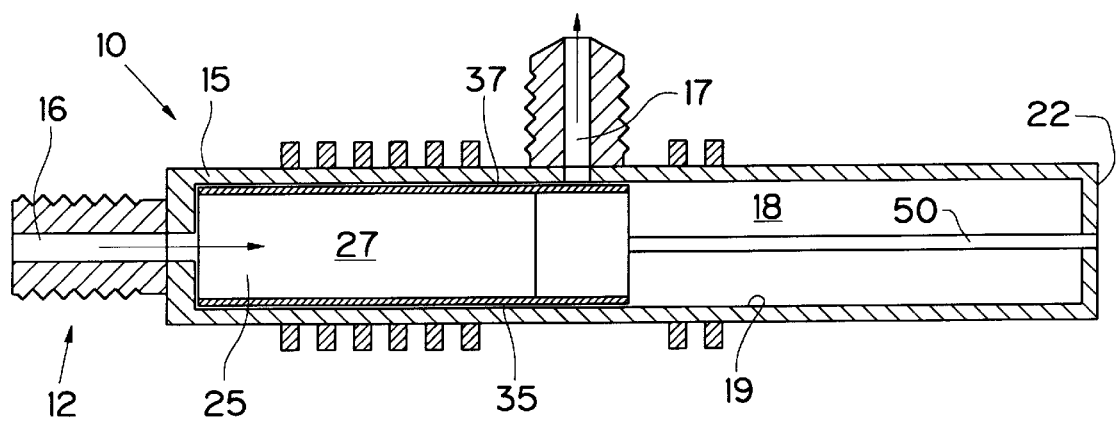
FIG. 4 is a schematic view of a cross section of a pressure relief device, according to yet another preferred embodiment of this invention.

In another preferred embodiment according to this invention, the bypass means comprise plug 25 having at least one passage 30 which is in communication with inlet 16. As shown in FIG. 3, when pressure relief device 10 is in the closed position, plug 25 is positioned within cavity 18 in a manner that blocks communication between outlet 17 and passage 30. As shown in FIG. 4, in the open condition of pressure relief device 10, plug 25 is positioned within cavity 18 in a manner which allows communication between outlet 17 and passage 30.

As shown in FIGS. 3 and 4, plug 25 has hollow core 27. By minimizing the mass of plug 25, for example with hollow core 27, the thermal response time is reduced because for a given amount of heat input, there is less plug 25 material through which heat is transferred. Plug 25 may also comprise a suitable passageway or channel that sufficiently accommodates discharge flow without a requirement for plug 25 to have a full hollow core 27.

Outer wall 28 of plug 25 may comprise port 29 which forms passage 30, in one preferred embodiment of this invention. In the preferred embodiment shown in FIGS. 3 and 4, outlet 17 is generally perpendicular to inlet 16. However, by designing a passageway, channel or other communication means for communicating the fluid between passage 30 and outlet 17, outlet 17 can be generally aligned with or parallel to inlet 16.

Although not shown in the drawings, it is apparent that a combination of passage 20 within plug housing 15 and passage 30 within plug 25 can be used to accomplish the same result of allowing communication between inlet 16 and outlet 17, when pressure relief device 10 operates in the open condition. For example, plug 25 as shown in FIG. 2 could comprise passage 30, as described with respect to FIGS. 3 and 4. In such preferred embodiment, the distance can be reduced that plug 25 must move with respect to plug housing 15, in order to allow communication between inlet 16 and outlet 17.

In one preferred embodiment according to this invention, indication means are used to indicate movement of plug 25 with respect to plug housing 15. In one preferred embodiment of this invention, the indication means comprise indicator pin 50, as shown in FIGS. 3 and 4. Exposure means can be used to make visible indicator pin 50 from outside of plug housing 15, when plug 25 is longitudinally displaced with respect to plug housing 15. In one preferred embodiment according to this invention, the exposure means comprise indicator pin 50 secured with respect to plug 25. At least a portion of indicator pin 50 extends beyond outer surface 22 of plug housing 15 when plug 25 is moved from a position of plug 25 when pressure relief device 10 is in the closed condition. In other preferred embodiments according to this invention, indicator pin 50 can be a rod, a tab, or any other suitable mechanical component that can indicate movement.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A pressure relief device operating between a closed condition wherein a fluid is contained in a chamber of a vessel and an open condition wherein the fluid is vented from the vessel, the pressure relief device comprising:

a plug housing, securement means for sealably securing said plug housing with respect to the vessel, said plug housing having an inlet, an outlet, a cavity and at least one bypass groove in communication with said outlet; and a plug, said plug mounted within said cavity, a closed upstream face of said plug preventing the fluid from flowing through said plug, at least one of said plug and said plug housing forming a void between said plug and said plug housing, a fusible alloy, said void at least partially filled with said fusible alloy, upon a release temperature of said fusible alloy said plug moveable within said cavity between the closed condition and the open condition;

in the closed condition said plug positioned within said cavity to block communication between said inlet and said outlet, and in the open condition said plug positioned within said cavity to allow communication between said inlet and said outlet via said at least one bypass groove.

2. A pressure relief device according to claim 1 wherein said bypass means comprise said plug housing having at least one passage in communication with said outlet, in the closed position said plug positioned within said cavity to block communication between said inlet and said at least one passage, and in the open condition said plug positioned within said cavity to allow communication between said inlet and said at least one passage.

3. A pressure relief device according to claim 2 wherein said at least one passage is positioned approximately parallel to a longitudinal direction of said cavity.

4. A pressure relief device according to claim 3 wherein a longitudinal dimension of said at least one passage is greater than a longitudinal length of a portion of said plug having a largest outer diameter.

5. A pressure relief device according to claim 2 further comprising relief means for preventing said plug from blocking said outlet in the open condition.

6. A pressure relief device according to claim 5 wherein said relief means comprise a stop body attached to said plug, and in the open condition said stop body positioned between said plug and an internal surface of said plug housing.

7. A pressure relief device according to claim 6 wherein said stop body is positioned at a central location of a downstream face of said plug, downstream with respect to a direction of flow of the fluid with respect to said plug in the open condition, and said stop body has at least one relief channel which forms communication between said at least one passage and said outlet when in the open condition.

8. A pressure relief device according to claim 2 wherein said outlet is generally aligned with and parallel to said inlet.

9. A pressure relief device according to claim 1 wherein said plug has a first longitudinal section and a second longitudinal section, and said first longitudinal section and said second longitudinal section have different outside diameters.

10. A pressure relief device according to claim 1 wherein said void is formed by an annular space between said plug and said plug housing.

11. A pressure relief device according to claim 1 wherein said fusible alloy fills at least a portion of a longitudinal length of said void.

12. A pressure relief device operating between a closed condition wherein a fluid is contained in a chamber of a vessel and an open condition wherein the fluid is vented from the vessel, the pressure relief device comprising:

a plug housing, securement means for sealably securing said plug housing with respect to the vessel, said plug housing having an inlet and an outlet, said plug housing having an internal surface forming a cavity, said internal surface having a void forming at least one bypass passage in communication with said outlet; and a plug, said plug mounted within said cavity, a closed upstream face of said plug preventing the fluid from flowing through said plug, at least one of said plug and said plug housing forming a void between said plug and said plug housing, a fusible alloy, said void at least partially filled with said fusible alloy, upon a release temperature of said fusible alloy said plug moveable within said cavity between the closed condition and the open condition;

in the closed condition said plug positioned within said cavity to block communication between said inlet and said outlet, and in the open condition said plug positioned within said cavity to allow communication between said inlet and said outlet via said at least one bypass passage.

\* \* \* \* \*